(12) United States Patent
Horvath

(10) Patent No.: US 10,110,639 B2
(45) Date of Patent: Oct. 23, 2018

(54) METHOD FOR TELECOMMUNICATION AND COMMUNICATION TERMINAL

(71) Applicant: Unify GmbH & Co. KG, Munich (DE)

(72) Inventor: Ernst Horvath, Vienna (AT)

(73) Assignee: Unify GmbH & Co. KG, Munich (DE)

( * ) Notice: Subject to any disclaimer, the term of this patent is extended or adjusted under 35 U.S.C. 154(b) by 235 days.

(21) Appl. No.: 15/028,610

(22) PCT Filed: Oct. 17, 2014

(86) PCT No.: PCT/EP2014/002804
§ 371 (c)(1),
(2) Date: Apr. 11, 2016

(87) PCT Pub. No.: WO2015/058845
PCT Pub. Date: Apr. 30, 2015

(65) Prior Publication Data
US 2016/0255119 A1    Sep. 1, 2016

(30) Foreign Application Priority Data
Oct. 25, 2013   (DE) .......................... 10 2013 017 790

(51) Int. Cl.
G06F 15/16         (2006.01)
H04L 29/06         (2006.01)

(52) U.S. Cl.
CPC ...... *H04L 65/1006* (2013.01); *H04L 65/1069* (2013.01); *H04L 65/1096* (2013.01)

(58) Field of Classification Search
CPC ............. H04L 65/1006; H04L 65/1069; H04L 65/1096

(Continued)

(56) References Cited

U.S. PATENT DOCUMENTS

| 2007/0100981 | A1  | 5/2007 | Adamczyk et al. |
| 2010/0111101 | A1* | 5/2010 | McKee ................ H04N 21/441 370/466 |
| 2012/0163573 | A1* | 6/2012 | Shibata ................... H04L 69/18 379/100.01 |

FOREIGN PATENT DOCUMENTS

| CN | 101035114 A | 9/2007 |
| EP | 2293512 A1  | 3/2011 |

OTHER PUBLICATIONS

International Preliminary Report on Patentability and Written Opinion of the International Searching Authority for PCT/EP2014/002804 dated Apr. 26, 2016 (Form PCT/ISA/237) English Translation.

(Continued)

*Primary Examiner* — Wing F Chan
*Assistant Examiner* — Joseph R Maniwang
(74) *Attorney, Agent, or Firm* — Buchanan Ingersoll & Rooney PC

(57) ABSTRACT

The invention concerns a telecommunication method, wherein a communication connection, initiated and controlled by the Session Initiation Protocol (SIP) provided by an SIP server (16, 24), is established to and/or from a communication terminal (10, 12), as well as a communication terminal (10, 12) configured for that purpose. According to the invention, a function address in the form of an SIP protocol element, which is or may be initiated by the communication terminal (10, 12), is generated dynamically for calling up at least one function of the SIP server (16, 24) that can be assigned to the respective communication connection and is at least temporarily available, wherein the SIP protocol element serves as the target address for an SIP message to the SIP server (16, 24) to call up the function.

20 Claims, 1 Drawing Sheet

(58) Field of Classification Search
USPC .................................... 709/227, 228, 230
See application file for complete search history.

(56) References Cited

OTHER PUBLICATIONS

Written Opinion of the International Searching Authority for PCT/EP2014/002804 dated Dec. 23, 2014 (Form PCT/ISA/237).
International Search Report for PCT/EP2014/002804 dated Dec. 23, 2014 (Form PCT/ISA/210).
Poikselka, et al., "The IMS: IP Multimedia Concepts and Services, 3rd edition", Jan. 1, 2009.
Definition of "Customer-premises equipment" from Wikipedia dated Mar. 8, 2018.

* cited by examiner

METHOD FOR TELECOMMUNICATION AND COMMUNICATION TERMINAL

CROSS-REFERENCE TO RELATED APPLICATIONS

This application is the United States national phase under 35 U.S.C. § 371 of PCT International Application No. PCT/EP2014/002804, filed on Oct. 17, 2014, which claims priority to German Application No. 10 2013 017 790.1, filed on Oct. 25, 2013.

BACKGROUND OF THE INVENTION

Field of the Invention

The invention concerns a telecommunication method, wherein a communication connection, initiated and controlled by the Session Initiation Protocol (SIP) provided by an SIP server, is established to and/or from a communication terminal. The invention further concerns a communication terminal configured such that a communication connection initiated and controlled by the Session Initiation Protocol (SIP) provided by an SIP server can be established to and/or from the communication terminal.

Background of the Related Art

In a communication connection initiated and controlled by the Session Initiation Protocol (SIP), such as a telephone connection, it can be necessary or desirable to call up certain additional functions that are normally provided by servers or network components equipped for that purpose. The Session Initiation Protocol offers corresponding protocol elements only for selected usage circumstances, such as retrieving location coordinates from a server, in this example a header field with a Universal Resource Identifier (URI) for retrieving location coordinates via the HTTP protocol. However, the SIP protocol has no standardized ability to call up preconfigurable functions directly using SIP, regardless of whether or not SIP components are participating in an SIP dialogue. Calling up, also known as addressing, a function of an SIP component participating in the communication connection, whether as part of or outside of the existing SIP dialogue, is not possible in the standard SIP.

A typical application case is calling up a Malicious Call Identification (MCID), which can still be done by the caller shortly after the communication connection is terminated, at the end of the call, for example. In this case, the participating gateway to the communication connection or to the call delays the communication connection or call termination process in the direction of the public network, while in the company network the allocated resources should be released as soon as possible after the end of the SIP dialogue. However, this results in the problem of directing the MCID call-up to the correct gateway and then linking it there with the appropriate communication connection. With known telecommunication methods and corresponding communication terminals, targeted dynamic addressing of the desired function, such as the MCID call-up, is not possible, and addressing the desired function outside of an existing SIP dialogue is rarely possible.

BRIEF SUMMARY OF THE INVENTION

Embodiments may address the problem of permitting flexible and easy control of SIP server functions in connection with a communications connection controlled by the SIP protocol.

According to embodiments of the invention, a function address in the form of an SIP protocol element, which is or may be initiated by the communication terminal, is generated dynamically for calling up at least one function of the SIP server that is at least temporarily available and can be assigned to the communication connection, wherein the SIP protocol element serves as the target address for an SIP message to the SIP server to call up the function.

DETAILED DESCRIPTION OF THE INVENTION

Figure 1:
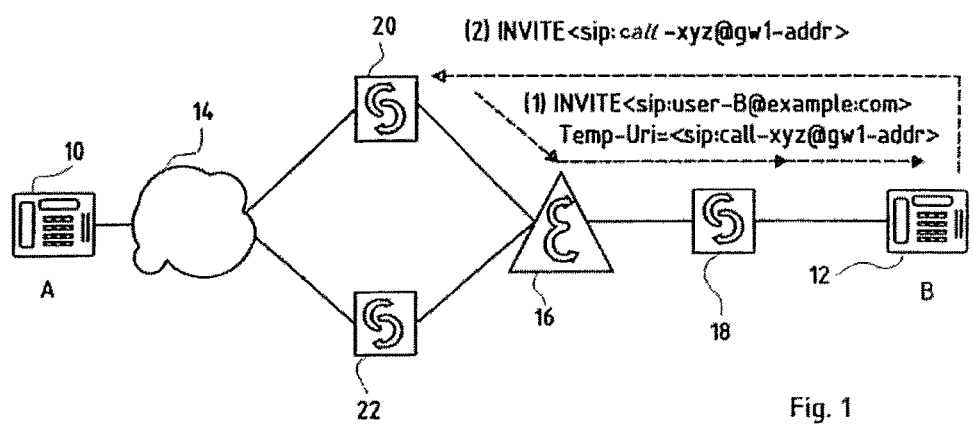
FIG. 1 shows a communication system for establishing a communication connection and executing a method of an embodiment of the invention.

According to embodiments of the invention, a function address in the form of an SIP protocol element, which is or may be initiated by the communication terminal, is generated dynamically for calling up at least one function of the SIP server that is at least temporarily available and can be assigned to the communication connection, wherein the SIP protocol element serves as the target address for an SIP message to the SIP server to call up the function.

According to embodiments of the invention, for a desired function a target address is dynamically generated in the form of an SIP protocol element. According to the invention, dynamic SIP are used addresses for function control in SIP communication connections. In this way, backward-compatible expansion of SIP signaling, in particular the dialogue model, is achieved and used for the targeted control of SIP messages to these function addresses, while retaining the other dialogue features.

The resulting advantages are pinpoint control of functions and greater efficiency due to embedding function control into the existing SIP dialogue. This eliminates the need for a second call, also known as a consultation call, for the purpose of activating a performance feature, for example. In summary, expanded telecommunication through SIP that is easier to control is achieved.

The invented configuration of the telecommunication method or the corresponding communication terminal makes it possible, in addition to dynamically and therefore flexibly addressing a desired function, to call up the function not only within the SIP dialogue during an established communication connection, but also outside of the SIP dialogue after termination of the communication connection. In particular, functions can be called up directly using SIP. According to the invention, the aforementioned advantages are achieved easily and with minimal expense.

The SIP protocol element is typically configured as a Session Initiation Protocol Universal Resource Identifier (SIP URI). The SIP protocol element is dynamically generated either by the SIP server that is providing the respective function or by the communication terminal that is calling up the respective function. The communication connection is preferably established through the SIP server and/or a gateway, wherein the SIP server and/or the gateway generates the function addresses. Alternatively, the communication terminal can generate the function addresses. In both configurations of the invention, the dynamic SIP protocol element serves as the target address for an SIP message to call up the corresponding function, and in particular the dynamic SIP URI is configured as an SIP element request URI.

It is especially preferable for function addresses generated at the gateway to include the gateway address and/or an identifier for the communication connection to be established. The SIP URI generated at the SIP server is preferably inserted into the SIP signaling. The at least temporarily available function and the features available with it are announced independently of where they are formed or generated.

The dynamic SIP protocol element is preferably announced by means of additional elements in an INVITE or response message, or, in other words, the function address is preferably integrated into an INVITE or response message. However, it should be understood that the dynamically generated SIP protocol element according to the invention is not limited to components lying directly in the signaling path.

For example, for a communication connection to be established, such as a call, a gateway can insert its address and its call ID into the original INVITE message. This signal, also known as Information, makes it possible for the called communication terminal, even after the communication connection is terminated or ended, to call up call-related data, such as a malicious call identification (MCID), directly from the gateway for a preset length of time, even though the related resources in the network have already been released after termination of the communication connection. This example illustrates that the invention allows for backward-compatible expansion of the SIP dialogue model, as well as targeted steering of SIP messages to function addresses.

In one preferred embodiment of the invented method, the function address is called up at a point in time that lies within a period which includes the duration of the established communication connection and an additional period after termination of the established communication connection. It is also advantageous for the dynamically generated function address to be deleted after a specified event, in particular after calling up the function and/or after the end of a certain period.

The invention further includes a computer program product for executing the invented method. Additional advantages and features of the invention are derived from the figures and from the following description of the drawing. The features shown in the figures are purely schematic and not to scale. According to the invention, the features mentioned previously and those described below can be implemented individually or in any combinations in an invented method, an invented computer program product, or an invented communication terminal.

FIG. 1 shows how a communication connection from a first communication station A to a second communication station B can be established. A communication terminal 10 is assigned to the first communication station A and another communication terminal 12 according to the invention is assigned to the second communication station B. A service provider 14, an SIP server 16, and a proxy server 18 are located between the two communication stations A and B or communication terminals 10 and 12. In addition, a first gateway 20 and a second gateway 22 parallel to the first are located between the service provider 14 and the SIP server 16.

To establish a communication connection from the first communication station A to the second communication station B, the first gateway 20, which receives the external call, generates a dynamic SIP protocol element, here an SIP URI, which contains both the gateway address and an ID for the incoming call, and includes this SIP URI in the element of an SIP INVITE message (1) shown here as an example in the direction of the second communication station B as the call target.

The temporarily generated SIP protocol element is provided for a possible MCID call-up, which can be sent to the first gateway 20, for example, in the form of a second INVITE message (2) from the subscriber being called, here the other communication terminal 12. The MCID call-up by means of the second INVITE message (2) from the other communication terminal 12 to the first gateway 20 can be assigned positively based on the ID contained in it to the communication connection between the communication stations A and B.

This can be accomplished either during the established communication connection or also at least one preset length of time after the communication connection is ended by the first communication terminal 10, i.e., after termination of the original SIP dialogue. The first gateway 20 discards the dynamic SIP URI as soon as an MCID call-up has taken place or is no longer possible, after the preset length of time, for example.

Figure 2:
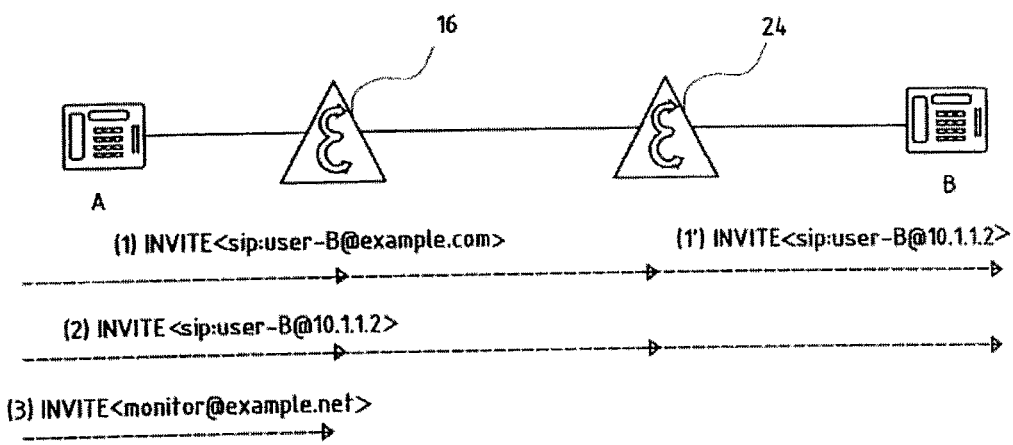
FIG. 2 shows a communication system for establishing a communication connection and executing a method of an embodiment of the invention.

FIG. 2 illustrates how a communication connection and an associated SIP dialogue from the first communication station A to the second communication station B can be established in another communication system. An SIP server 16 and another SIP server 24 are located between the two communication stations A and B. The servers 16 and 24 can have domain names. For example, the server 16 has the domain name "example.net" and the server 24 has the domain name "example.com". In the embodiment shown in FIG. 2, functions targeted within the scope of an existing communication connection can be called up without having to leave the signaling path of the SIP dialogue belonging to the communication connection.

For this, instead of the usual contact address for calls within the SIP dialogue according to the SIP standard, the communication terminal assigned to the first communication station A enters an SIP protocol element, here an SIP URI for the desired function, as the target address, here an SIP element request URI, with the other message elements remaining unchanged. An SIP call-up (3) configured in this way can end in the SIP server 16, which recognizes the function URI and executes the desired function, such as the "monitor" feature, for example.

The INVITE messages shown as examples in FIG. 2 demonstrate that normal calls (1), (2) within the SIP dialogue shown between the two communication stations A, B pass through to the contact address of the second communication station B, wherein a monitor call-up (3) ends at the SIP server 16, although it is using the existing SIP dialogue.

The features of the invention described with reference to the illustrated embodiments, such as the dynamic SIP URI that contains both the gateway address and an ID for the incoming call and is included in the element of an SIP INVITE message (1) shown in FIG. 1, can also exist in other embodiments of the invention, such as the SIP URI according to FIG. 1 instead of the SIP element request URI in the embodiment shown in FIG. 2, except when stated otherwise or when impossible for technical reasons.

LIST OF REFERENCE INDICATORS

10 Communication Terminal
12 Additional Communication Terminal
14 Service Provider
16 SIP Server 18 Proxy Server
20 First Gateway
22 Second Gateway
24 Additional SIP Server
A First Communication Station
B Second Communication Station

I claim:

1. A method for initiating telecommunications between a first communication terminal of a first user and a second communication terminal of a second user, comprising:
a first communication device generating a dynamic protocol element in response to receiving a first call for establishing a communication connection between the first communication terminal and the second communication terminal, the protocol element comprising an address of the first communication device and an identifier for the first call, the first communication device comprising a processor connected to a non-transitory computer readable medium;
the first communication device sending the generated dynamic protocol element to the second communication terminal in response to receiving the first call for establishment of the communication connection; and
the first communication device using the generated dynamic protocol element to call up call-related data associated with the communication connection of the first call in response to receiving a request having the protocol element that is received during the communication connection or within a pre-selected time period after the communication connection ends.

2. The method of claim 1, wherein the protocol element is a Session Initiation Protocol (SIP) protocol element that is configured as a SIP Universal Resource Identifier (SIP URI).

3. The method of claim 1, comprising:
sending the request to the first communication device, the request being sent within SIP dialogue during the communication connection.

4. The method of claim 1, wherein the first communication device is a gateway.

5. The method of claim 1, wherein the request is a malicious call identification call-up.

6. The method of claim 1, wherein the generated dynamic protocol element is a function address that is sent to the second communication terminal within an INVITE message.

7. The method of claim 1, wherein the protocol element is a function address, the method also comprising:
the first communication device calling up a function using the protocol element in response to receiving the request within the pre-selected time period after termination of the communication connection.

8. The method of claim 1, comprising:
the first communication device discarding the dynamically generated protocol element after responding to the request.

9. The method of claim 1, wherein the protocol element is a Session Initiation Protocol element.

10. The method of claim 9, wherein the first communication device is a SIP server.

11. The method of claim 10, wherein the request is a malicious call identification call-up, the method also comprising:
the first communication device discarding the dynamically generated protocol element after responding to the request.

12. A non-transitory computer readable medium having a program stored thereon such that the program defines a method that is performed by a communication device having a processor that executes the program, the method comprising:
the first communication device generating a dynamic protocol element in response to receiving a first call for establishing a communication connection between the first communication terminal and the second communication terminal; the protocol element comprising an address of the first communication device and an identifier for the first call;
the first communication device sending the generated dynamic protocol element to the second communication terminal in response to receiving the first call for establishment of the communication connection;
the first communication device using the generated dynamic protocol element to call up call-related data associated with the communication connection of the first call in response to receiving a request having the protocol element that is received during the communication connection or within a pre-selected time period after the communication connection ends.

13. A communication terminal comprising:
hardware comprising a processor connected to non-transitory computer readable medium;
the communication terminal configured such that a communication connection initiated and controlled by Session Initiation Protocol (SIP) is establishable with another communication terminal via an SIP server or a gateway to which the communication terminal is communicatively connectable;
the communication terminal configured to generate a function address as
an SIP protocol element to serve as a target address of an SIP message and the communication terminal configured to send the SIP message having the function address to the SIP server or the gateway to call up a function within SIP dialogue the communication terminal exchanges during the communication connection the communication terminal has with another communication terminal.

14. The communication terminal of claim 13, wherein the SIP protocol element is a SIP Universal Resource Identifier (SIP URI).

15. The communication terminal of claim 13, wherein the communication terminal is configured to discard the SIP protocol element after the request is function is called up.

16. The communication terminal of claim 13, wherein the function is a malicious call identification call-up.

17. The communication terminal of claim 13, wherein the communication terminal is configured to generate the function address dynamically during the communication connection.

18. The communication terminal of claim 13, wherein the SIP message is sent to the gateway.

19. The communication terminal of claim 13, wherein the SIP message is sent to the SIP server.

20. The communication terminal of claim 19, wherein the SIP message is configured so that the SIP server recognizes the function from the function address included in the SIP message to execute the function.

* * * * *